US008296147B2

(12) United States Patent
Sharma

(10) Patent No.: US 8,296,147 B2
(45) Date of Patent: Oct. 23, 2012

(54) INTERACTIVE VOICE CONTROLLED PROJECT MANAGEMENT SYSTEM

(75) Inventor: Rajesh Sharma, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1445 days.

(21) Appl. No.: 11/462,899

(22) Filed: Aug. 7, 2006

(65) Prior Publication Data

US 2008/0033994 A1 Feb. 7, 2008

(51) Int. Cl.
*G10L 21/00* (2006.01)
*G10L 15/20* (2006.01)
*G10L 17/00* (2006.01)
*G06F 17/27* (2006.01)
*H04M 1/64* (2006.01)

(52) U.S. Cl. ......... 704/270.1; 704/9; 704/233; 704/246; 379/88.01

(58) Field of Classification Search ............... 704/9, 270, 704/273
See application file for complete search history.

(56) References Cited

U.S. PATENT DOCUMENTS

| | | | | |
|---|---|---|---|---|
| 5,765,140 A * | 6/1998 | Knudson et al. | ................... | 705/9 |
| 5,790,637 A * | 8/1998 | Johnson et al. | ............ | 379/88.04 |
| 5,836,011 A * | 11/1998 | Hambrick et al. | ........... | 705/7.12 |
| 6,101,481 A * | 8/2000 | Miller | ............................... | 705/9 |
| 6,400,806 B1 * | 6/2002 | Uppaluru | ................... | 379/88.02 |
| 6,999,930 B1 * | 2/2006 | Roberts et al. | ............ | 704/270.1 |
| 7,027,463 B2 * | 4/2006 | Mathew et al. | ................ | 370/463 |
| 7,127,403 B1 * | 10/2006 | Saylor et al. | ................... | 704/275 |
| 7,251,604 B1 * | 7/2007 | Thenthiruperai | .......... | 704/270.1 |
| 7,286,999 B2 * | 10/2007 | Majd et al. | .......................... | 705/8 |
| 7,437,304 B2 * | 10/2008 | Barnard et al. | .............. | 705/7.15 |
| 7,440,898 B1 * | 10/2008 | Eberle et al. | ................ | 704/270.1 |
| 7,634,068 B1 * | 12/2009 | Flammer | ..................... | 379/88.23 |
| 2002/0194274 A1 * | 12/2002 | Kroeger | ......................... | 709/205 |
| 2004/0193703 A1 * | 9/2004 | Loewy et al. | ................. | 709/220 |
| 2005/0033582 A1 * | 2/2005 | Gadd et al. | ..................... | 704/277 |
| 2005/0080628 A1 * | 4/2005 | Kuperstein | ................. | 704/270.1 |
| 2006/0122834 A1 * | 6/2006 | Bennett | ......................... | 704/256 |
| 2006/0168259 A1 * | 7/2006 | Spilotro et al. | ................ | 709/229 |

OTHER PUBLICATIONS

Xie, "A Linguistic Study of Process Modeling Languages", 2001, Department of Computer Science & Engineering, University of Washington. http://www.cs.washington.edu/homes/taoxie/research.htm, pp. 1-13.*

* cited by examiner

*Primary Examiner* — Richemond Dorvil
*Assistant Examiner* — Olujimi Adesanya

(57) ABSTRACT

A method for facilitating project management includes identifying a user, identifying a project management access level for the user, dynamically generating a voice dialog based on the identified project management access level, dynamically generating grammars associated with the voice dialog based on the identified project management access level, and serving the voice dialog to the user. The method further includes receiving a voice request from the user corresponding to a generated grammar; retrieving project management information associated with the received voice request; dynamically generating a responsive voice dialog including the retrieved project management information; dynamically generating responsive grammars associated with the responsive voice dialog; and serving the responsive voice dialog to the user.

22 Claims, 8 Drawing Sheets

INTERACTIVE VOICE CONTROLLED PROJECT MANAGEMENT SYSTEM

BACKGROUND

Project management is an approach used to manage work within the constraints of time, cost and performance. The complex relationships between various competing resources, outcomes and client expectations that affect the performance and delivery of specified tasks require the application of methodologies particularly suited to the management of unique undertakings. For example, the tasks might involve managing a plurality of technically complex projects, managing funding, and combining and managing the talents and time of hundreds of people. Project management has evolved to ensure that all such tasks are successfully completed in a most efficient and optimum manner.

Successfully managing a project not only depends on individuals' roles but also how successfully each member of the project team can perform and manage project management functions. FIG. 1 is a block diagram illustrating a conventional project management system 100 including various tools and applications. As illustrated, project management system 100 enables management through various disparate applications and environments, e.g., network or Internet based applications 105, client/server applications (e.g., Citrix or virtual network connection (VNC) applications) 110, stand alone applications 115, or query-based applications 120. In known project management schemes, details of the project management functions are generally stored in one or more databases or data structures 125. The project management information or data may be stored in various formats, such as, for example, word processing documents, spreadsheet documents, or another project management-specific format, such as Microsoft Project™, or relational data base management system etc. These applications may provide an interface that can be used by a project's members to perform different functions, for example, updating a task, deleting a task, adding a new task, assigning resource(s) to a task etc.

Unfortunately, existing project management applications and project management environments fail to provide a universal or ubiquitous method of identifying, retrieving, and acting on project management information.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF PREFERRED EMBODIMENTS

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention allow a user to access and manipulate project management information using a voice-controlled interactive environment.

Figure 1:
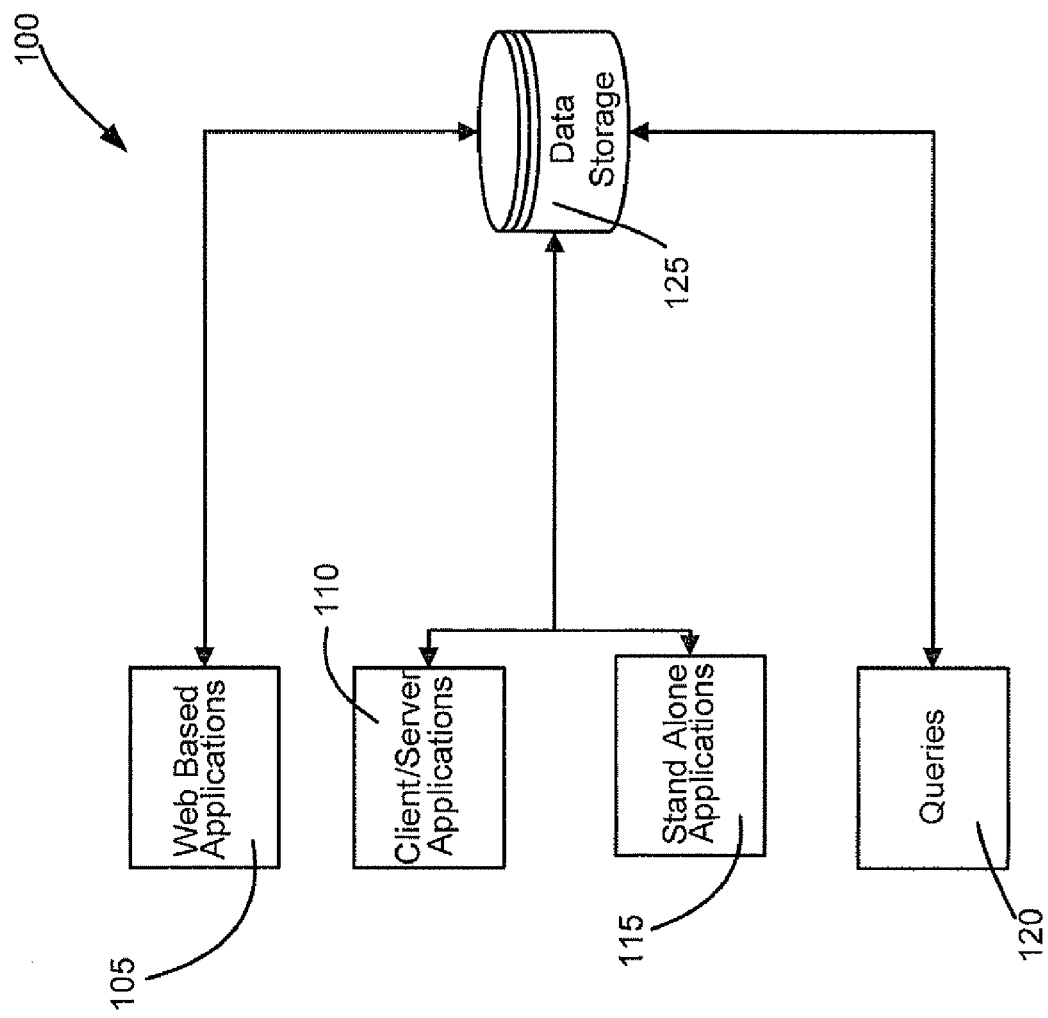
FIG. 1 shows a conventional project management environment.
Figure 2:
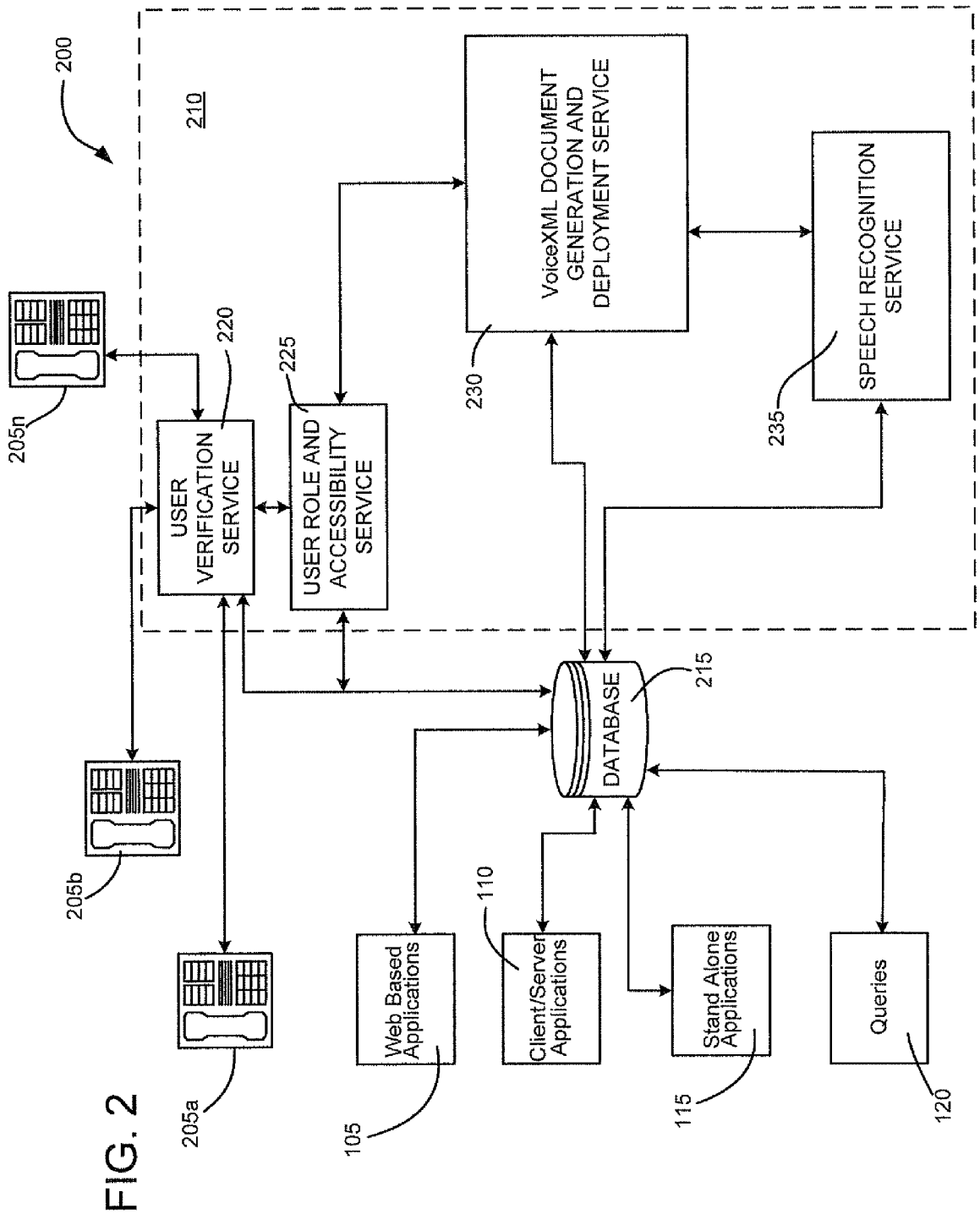
FIG. 2 shows an environment for implementing an embodiment of the present invention flow chart for one embodiment of the invention.

FIG. 2 shows a network environment 200 compatible with embodiments of the invention. As illustrated, environment 200 may include a number of telephony devices 205a, 205b, and 205n (collectively referred to as telephony devices 205), an IVR system 210, and one or more databases 215. In one implementation, IVR system 210 may include a user verification service 220, a user role and accessibility service 225, a VoiceXML document generation and deployment service 230, and a speech recognition service 235. The components of network environment 200 may be located at remote locations, but are logically connected and can communicate through other networks, such as a data network using communication protocols, including IP (Internet Protocol), SIP (Session Initiation Protocol), and RTP (Real Time Protocol). In other embodiments, the network components may be located at the same location where functionality of the components of IVR system 210 and database 215 may be combined into a single entity. As discussed above, with respect to FIG. 1, database 215 may be operatively connected to a number of conventional project management tools, such as web-based management application 105, client/server management application 110, stand alone management application 115, and query-based management application 120.

In operation, when a user picks up his phone and goes off hook using one of telephony devices 205 (e.g., a voice over internet protocol (VOIP) phone, a conventional public switched telephone network (PSTN) phone, or a mobile (e.g., cellular) phone), IVR system 210 may authenticate the user at user verification service 220. IVR system 210 may further determine the projects with which the user is affiliated as well as the user's role in those projects at user role and accessibility service 225. IVR system 210 may also provide the user with information and voice command options for managing and interacting with each of the identified projects at VoiceXML document generation and deployment service 230. Information presented to the user via IVR system 210 may be dynamically modified based on the content of database(s) 215. Speech recognition service 235 may then operate to receive voice information or "utterances" from the user. In response to the received voice information and/or recognition against grammars associated with the respective VoiceXML document to which they respond, additional VoiceXML documents may be generated and/or deployed. Alternatively, speech recognition service 235 may operate to modify project management information or project management data in database(s) 215 based on the received voice information or request. In this manner, effective project management functions may be performed without requiring that the user directly access the conventional project management tools described above.

Figure 3:
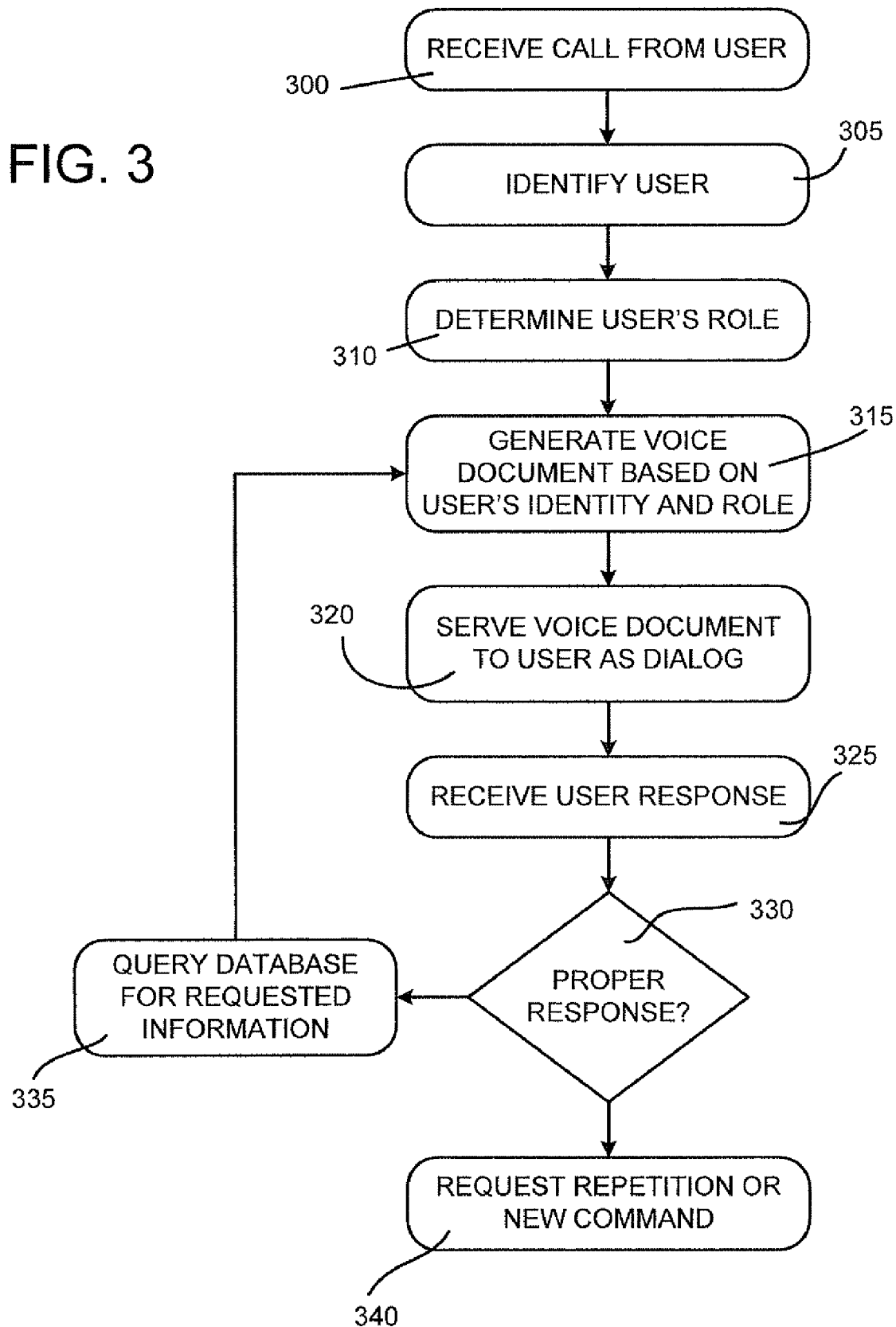
FIG. 3 is a flow chart illustrating exemplary processing for facilitating project management functionality via the environment of FIG. 2.

FIG. 3 is a flow chart illustrating exemplary processing for facilitating project management functionality via telephony devices. Processing may begin with IVR system 210 receiving a call from a user via telephony device 205 (act 300). The user is identified by user verification service 210 (act 305). In one implementation consistent with principles of the invention, user verification service 220 may be configured to authenticate a user using any suitable methodology, such as, biometric and/or informational interrogation. For example, users may be prompted to speak a certain phrase or personal identification number (PIN). In a biometric interrogation, the received voice response may be statistically compared to a voice print a previously stored in a user profile maintained in database 215 on behalf of the user to ascertain and verify the identity of the user. Additionally, the voice response may be further examined to determine the accuracy of the user's response, to provide an additional level of security and authentication. In a solely informational interrogation, the received voice response may be recognized and compared to a correct response without performing biometric verification.

Once identified and/or authenticated, the user's access to projects or types of information associated with those projects may be determined by user role and accessibility service 225 (act 310). In one implementation consistent with the invention, user role and accessibility service 225 may examine project information in database(s) 215 associated with the user's identification to determine the projects, the user's role in the identified projects, and the levels and types of information and management functions that the user is permitted to access and perform, respectively. For example, a particular user may be identified as a project manager for a given project and may be permitted to perform functions commensurate with that role. Similarly, a user identified as a team member may be provided with access to a significantly reduced number of management functions.

Once the user's access permissions have been determined, VoiceXML document generation and deployment service 230 may generate a VoiceXML document based on the user's available project management options (act 315). For example, an initial VoiceXML document may be generated indicating or otherwise listing those projects for which the user has been permitted access.

VoiceXML uses the extensible markup language (XML) format to specify interactive voice dialogues between a human and a computer. In many ways, VoiceXML is analogous to HyperText Markup Language (HTML), and brings the same advantages of web application development and deployment to voice applications that HTML brings to visual applications, Just as HTML documents are interpreted by a visual web browser, VoiceXML documents are interpreted by a voice browser accessible by the user via telephony device 205. VoiceXML documents are textually created When the user accesses IVR system 210's voice browser and begins a dialog, the IVR system 210 may dynamically generate and respond to the user with a VoiceXML document using a text-to-speech (TTS) application to provide the dialog to the user (act 320).

Figure 4:
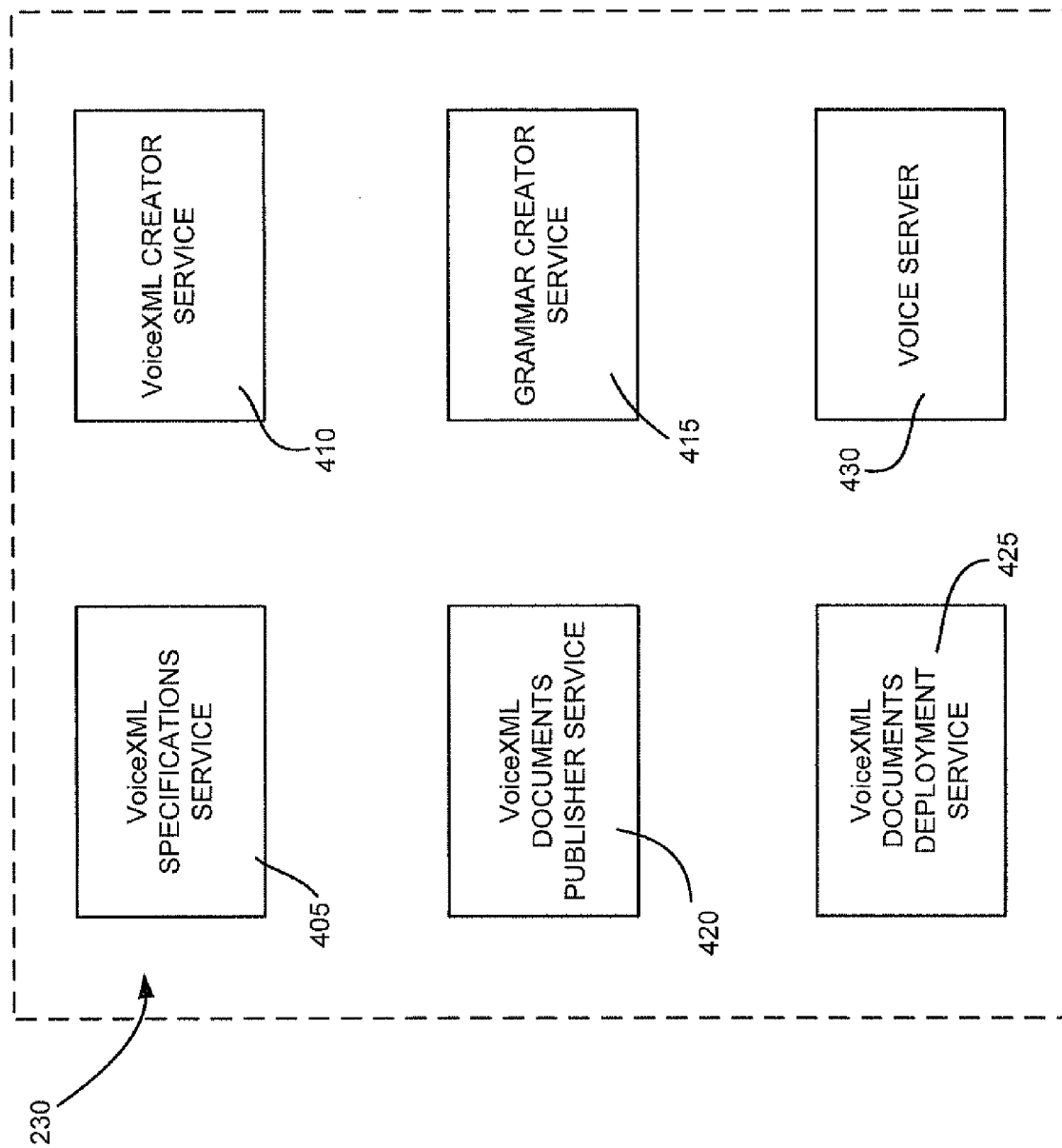
FIG. 4 is a block diagram illustrating one implementation of the Voice Extensible Markup Language (VoiceXML) document generation and deployment service of FIG. 2.

FIG. 4 is a block diagram illustrating one implementation of VoiceXML document generation and deployment service 230 consistent with principles of the invention. As shown, VoiceXML document generation and deployment service 230 may include a VoiceXML specifications service 405, a VoiceXML elements creator service 410, a grammar creator service 415, a VoiceXML documents publisher service 420, a VoiceXML documents deployment service 425, and a voice server 430.

VoiceXML specifications service 405 may be configured to specify the various defined VoiceXML elements and the relationship between them as recommended by the World Wide Web Consortium (W3C) VoiceXML group. For example, the <vxml> element is the root element of every VoiceXML document. Accordingly, VoiceXML specifications service may be configured to add the <vxml> element as a root element for each generated VoiceXML document.

VoiceXML elements creator service 410 may be configured to use data from database(s) 215 that is associated with a user's identification or access permissions level and create VoiceXML documents containing the root <vxml> element and all the other children elements to be played to the user.

Grammar creator service 415 may be configured to create any necessary grammar to enable user's to speak the necessary function they would like to perform. The format of the grammar may be of any type, for example Speech Recognition Grammar Specification (SRGS), Grammar Specification Language (GSL), etc. For example, in an active project entitled 'Payment Processing Types', grammar creator service 415 may create grammar that enables a project manager to request information using the following statement: "Give me the team lead for the 'Payment Processing Types' project". Absent specification of suitable response grammars, IVR system 210 would be unable to properly interpret user responses to information provided to the user in a VoiceXML document via voice server 430.

VoiceXML documents publisher service 420 may be configured to publish a VoiceXML document for a particular user in order to be deployed by VoiceXML document deployment service 425. The generated VoiceXML document could be a static i.e. with extension vxml or they could be dynamic i.e. servlets, java server pages, active server pages, etc. In one implementation, VoiceXML documents may be tailored different based on defined user proficiencies and capabilities. For example, users designated as expert users may be provided with abbreviated menu options or other voice shortcuts to increase the speed with which voice navigation may be performed. Alternatively, VoiceXML documents provided for more novice users may result in more descriptive voice prompts being served to the user.

Once created and published, a VoiceXML document may be deployed by VoiceXML document deployment service 425 to a server 430. In implementations consistent with principles of the invention, server 430 may be an application server and/or web server or any other type of server that can serve the VoiceXML documents to the user via telephony device 205.

Returning to FIG. 3, once a VoiceXML document has been created and served to the user, IVR system 210 may receive a voice response or request from the user at speech recognition service 235 (act 325). Depending on the user's response and the grammars generated to recognize the response, information or additional options may be provided to the user. For example, a served VoiceXML document may provide a listing of current projects. IVR system 210 then determines whether the received voice response is an appropriate or recognized response (act 330). As described above, grammars for the VoiceXML document have been previously defined and may facilitate the recognition of a number of suitable queries. For example, a defined grammar may enable recognition and response to phrases such as "Tell me how many activities are behind schedule", "Who is the team lead?", "What are my critical state projects?", etc. In response a recognized request, IVR system 210 may query database(s) 215 for the proper response (act 335) and return to act 315 and forward the information to VoiceXML specifications service 405, thereby initiating creation and serving of a responsive VoiceXML document that includes the answer to the user's request. If a received response is not recognized, IVR system 210 may request clarification or repetition from the user (act 340).

In accordance with principles of the invention, IVR system 210 may perform outbound call functionality to user telephony devices 205 either upon request from a user or unilaterally in accordance with defined project management business rules. In the embodiment described above, users may ask IVR system 210 to place outbound calls to individuals or groups associated with projects. In response to such a request, IVR system may dial the phone number or numbers associated with the requested individual or individuals and connect the requested user upon call placement. In this manner, efficient communication between project participants may be facilitated.

Figure 5:
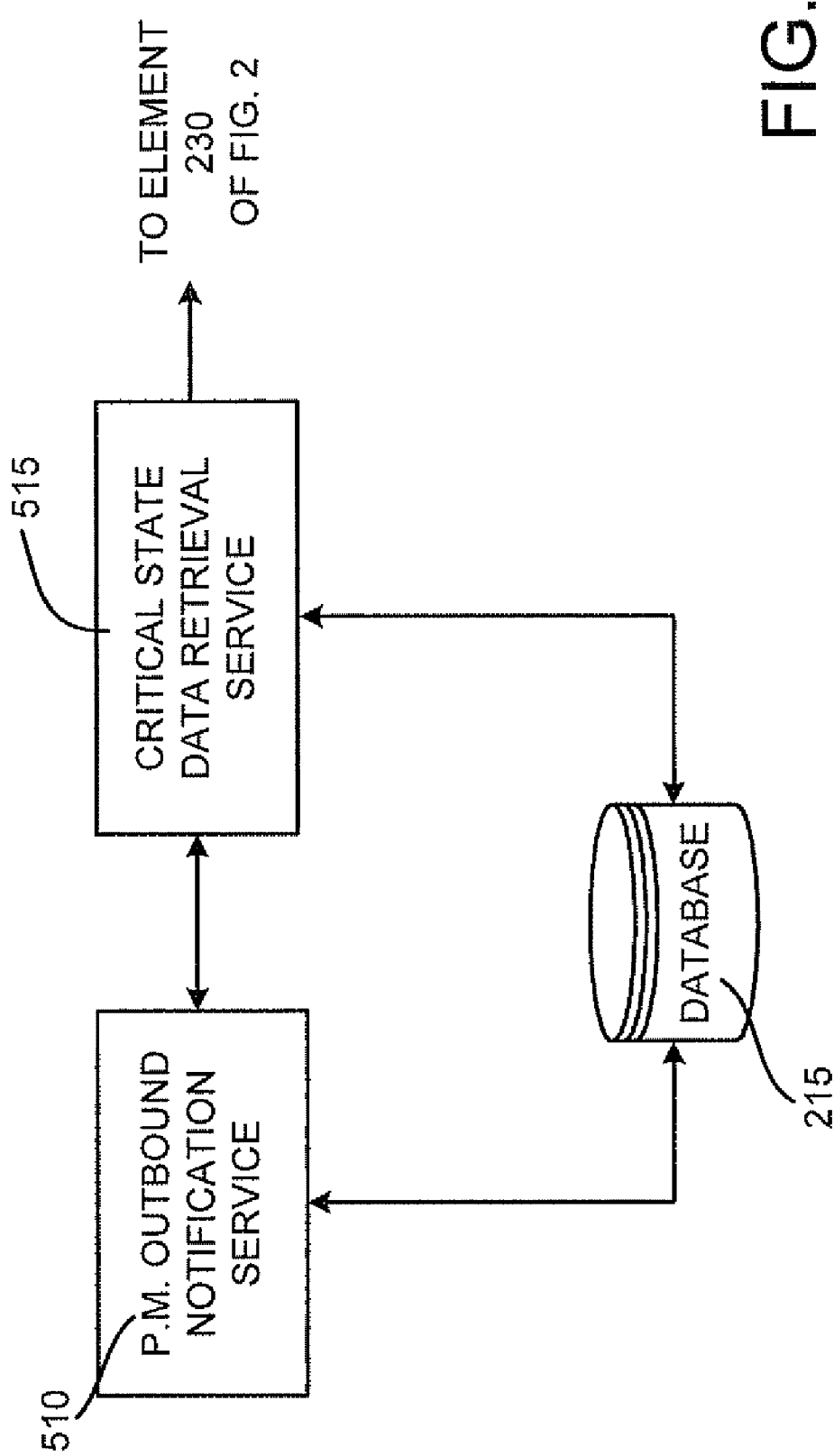
FIG. 5 is a block diagram illustrating additional elements of the interactive voice response (IVR) system of FIG. 2 to facilitate outbound call notifications.

FIG. 5 is a block diagram illustrating additional elements of IVR system 210 consistent with principles of the invention. As shown, IVR system 210 may include a project management outbound notification service 510 and a critical state data retrieval service 515. Each of these services 510 and 515 may be operatively connected to database(s) 215 and VoiceXML document generation and deployment service 230.

Project management outbound notification service 510 may be configured to monitor project states and provide information relating to projects having critical states in the form of an outbound notification to critical state data retrieval service 515. Each critical state may defined by the project management team and the business rules the respective project follows. For example, a project one day behind schedule may trigger an outbound notification stating that the project has reached the critical state. Service 510 may provide any necessary information (for example project name, project manager's name, resources, how many days project is behind, etc.) to critical state project's data retrieval service 515.

Upon receipt of an outbound critical state notification from service 510, critical state project's data retrieval service 515 retrieves additional information about the project that has gone into the critical state from database(s) 215. For example, critical state project's data retrieval service 515 may identification and contact information for the project manager, team leaders, etc., for the project, the number and nature of any overdue tasks, etc. Once all the necessary information is gathered critical state project's data retrieval service 515 may perform and outbound call to any defined telephone numbers. Additionally, the critical state information may be provided to VoiceXML document generation and deployment service 230 for generation and deployment of a suitable VoiceXML document and associated grammars.

Figure 6:
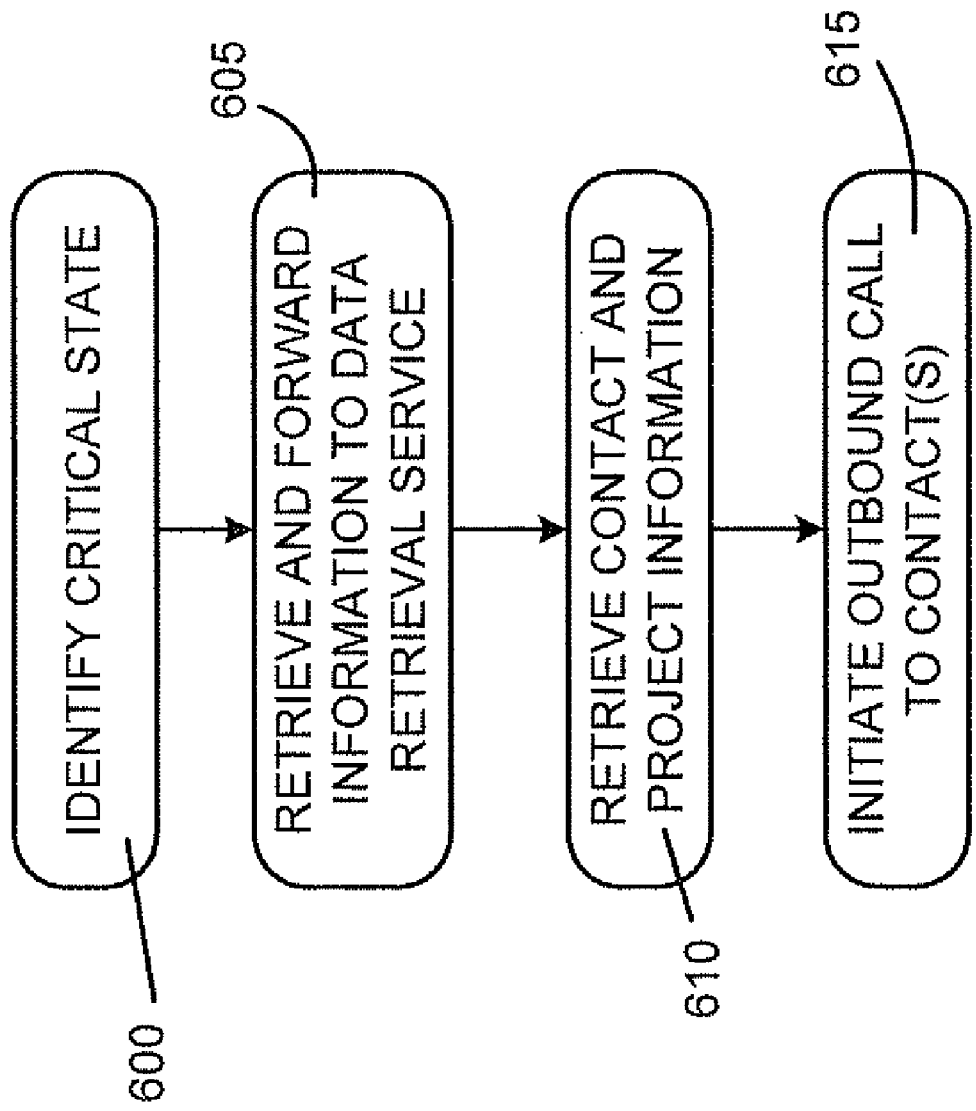
FIG. 6 is a flow diagram illustrating exemplary processing for providing outbound call functionality in the IVR system of FIG. 2.

FIG. 6 is a flow diagram illustrating exemplary processing for providing outbound call functionality in IVR system 210. Processing may begin with project management outbound notification service 510 identifying a critical state (act 600). Information regarding the critical state is retrieved and an outbound notification is passed to critical state project's data retrieval service 515 (act 605). Critical state project's data retrieval service 515 retrieves contact and other project information based on defined project rules (act 610) and dials one or more project contacts (act 615). Critical state information may then be passed to VoiceXML generation and deployment service 230 for generating an appropriate VoiceXML document.

EXAMPLES

Figure 7:
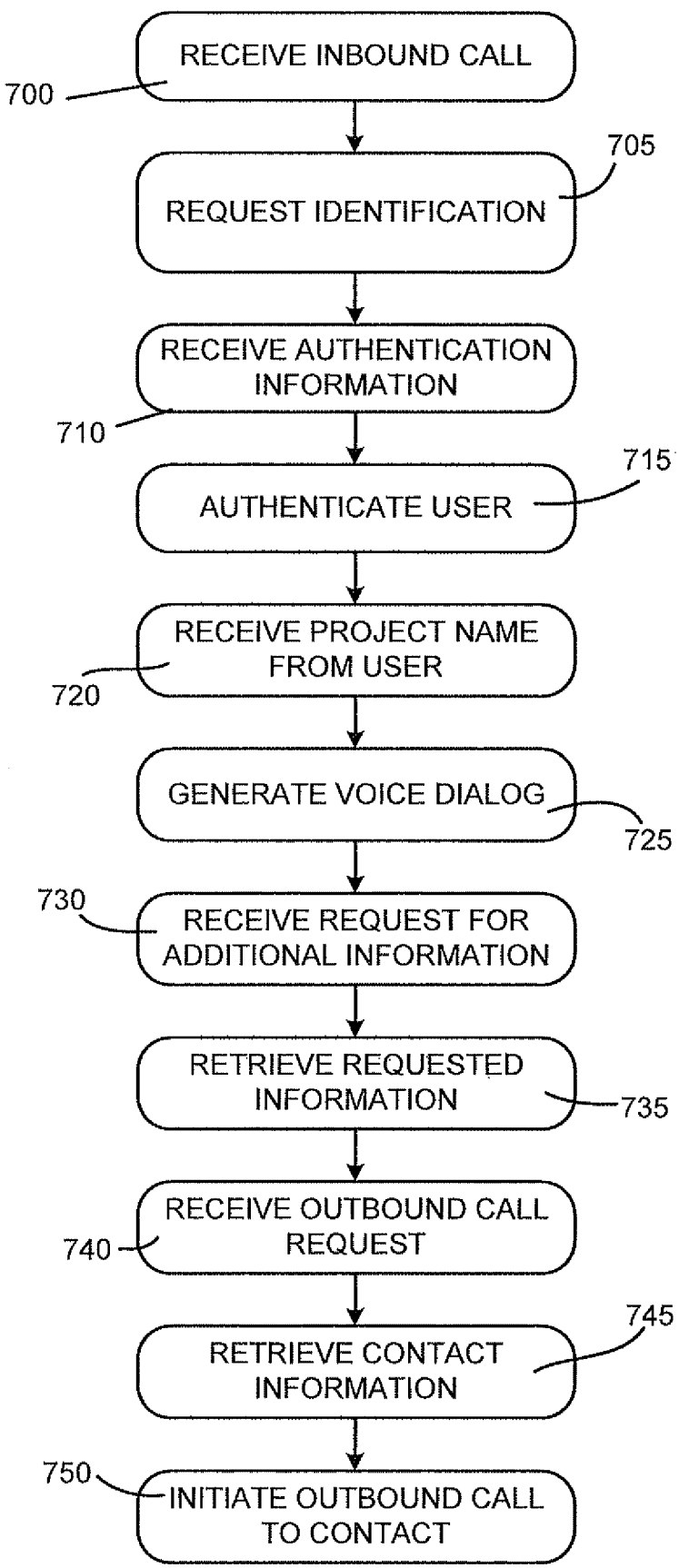
FIG. 7 is a flow diagram illustrating exemplary call processing for inbound project management calls.

FIG. 7 is a flow diagram illustrating exemplary call processing for inbound project management calls in one implementation of project management IVR system 210, described in detail above. Initially IVR system 210 receives an inbound call from a user (act 700). In response, IVR system 210 requests identification (act 705). The user then provides the requested authentication information (e.g., voice print, PIN number, password, etc.). IVR system 210 then receives the authentication from the user (act 710). IVR system 210 authenticates the user and serves a voice dialog based on a dynamically generated VoiceXML document to the user (act 715). For example, IVR system 210 may serve the following dialog: "You have been identified as John Doe. Currently you have five active and three dormant projects. Please tell me the name of the project you would like to know the details about, or say "List" to listen to the list of the projects."

IVR system 210 may receive a project name from the user, e.g., "Acme payment processing" (act 720). In response, IVR system 210 may serve a dynamically generated voice dialog including information relating to the requested project (act 725). For example, the served voice dialog may include: "The team lead for Acme payment processing is John Doe II and the project is in the development phase." As described above, the information provided may be dynamically configured to include only that information that the user is authorized to received.

In response to the dialog, a request for additional information relating to the project may be received from the user (act 730). For example, the user may request the following: "How many resources are assigned to this project." Provided that the received request corresponds to a defined grammar associated with the VoiceXML document resulting in the prior dialog, the IVR system will retrieve the requested information from database(s) 215 and dynamically generate a dialog including the retrieved information (act 735). For example, the next dialog may include: "There are three developers and two quality assurance representatives."

IVR system 210 may receive a user request to place an outbound call to a project member by speaking: "Call team lead" (act 740). In response, IVR system 210 may retrieve contact information for the requested individual (act 745) and initiate an outbound call to the individual (act 750).

Figure 8:
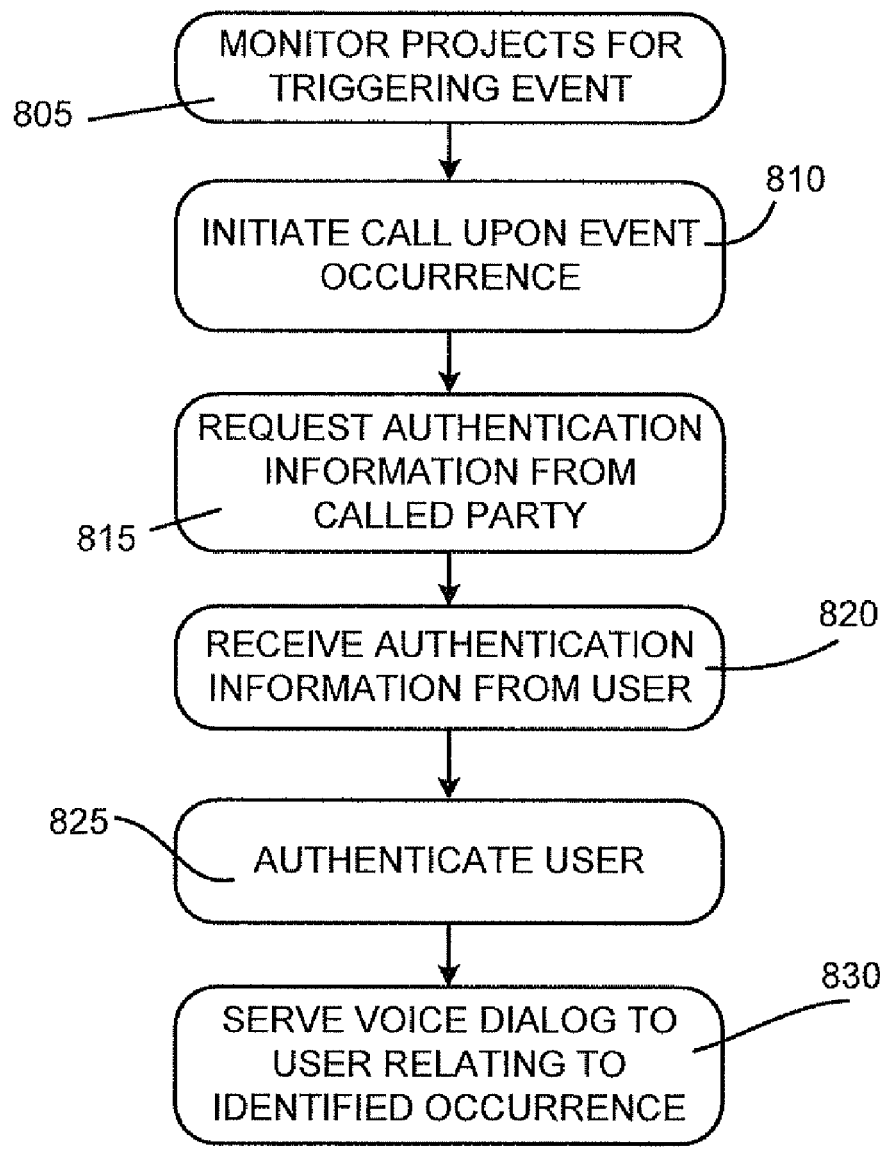
FIG. 8 is a flow diagram illustrating exemplary call processing for an outbound project management call.

FIG. 8 is a flow diagram illustrating exemplary call processing for an outbound project management call in accordance with one implementation of project management IVR system 210, described in detail above. Initially IVR system 210 may monitor projects associated therewith for critical tasks or other outbound notification triggering events, such as task completion, project updates, or any other defined events (act 805). Upon identification of such an event, IVR system 210 may initiate a call to a predefined representative or representatives associated with the event (act 810). Upon call pickup, IVR system 210 may serve an introductory authentication dialog to the user, requesting authentication information prior to providing any project information (act 815). IVR system 215 then receives authentication information from the user (act 820), authenticates the user (act 825) and serves a voice dialog containing the information relating to the identified event (act 830). IVR system 210 may then receive additional requests for project information or provide additional outbound calls in the manner described above, with respect to FIG. 7.

CONCLUSION

Implementations consistent with the principles of the invention enable efficient, voice-based project management.

More specifically, an interactive voice control system may be configured to dynamically authenticate and respond to user requests for project management information. Additionally, an interactive voice response system consistent with principles of the invention may also facilitate outbound calls upon request or in response to monitored project information.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while a series of acts have been described with respect to FIGS. 3 and 6-8, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   identifying, by one or more devices, a user;
   identifying, by the one or more devices and based on identifying the user, a plurality of project management access levels for the user,
      each of the identified plurality of project management access levels being associated with information that the user is permitted to access for each of a plurality of projects associated with the user;
   dynamically generating, by the one or more devices and based on the information associated with at least one of the identified plurality of project management access levels, a first Voice Extensible Markup Language (VoiceXML) document and a first grammar associated with the dynamically generated first VoiceXML document;
   dynamically generating, by the one or more devices, a voice dialog based on the dynamically generated first VoiceXML document;
   providing, by the one or more devices, the generated voice dialog to the user;
   receiving, by the one or more devices, a voice request from the user corresponding to the generated first grammar, the received voice request being associated with a particular project of the plurality of projects;
   retrieving, by the one or more devices and based on the received voice request, project management information associated with the particular project;
   dynamically generating, by the one or more devices and based on the retrieved project management information, a second Voice Extensible Markup Language (VoiceXML) document and a second grammar associated with the second VoiceXML document;
   dynamically generating, using one or more devices and based on the dynamically generated second VoiceXML document, a responsive voice dialog including the retrieved project management information; and
   providing, by the one or more devices, the responsive voice dialog to the user,
      the provided responsive voice dialog including a phrase identifying a role of an individual associated with the particular project and a phase of the particular project.

2. The method of claim 1,
   where identifying the user further comprises:
      receiving a spoken utterance from the user;
      determining whether the spoken utterance matches information included in a database; and
      authenticating the user when the spoken utterance matches the information included in the database,
   where generating the first VoiceXML document includes:
      identifying a proficiency associated with the authenticated user;
      generating, based on the proficiency associated with the authenticated user, the first VoiceXML document to include first VoiceXML information associated with an experienced user when the proficiency corresponds to the experienced user; and
      generating, based on the proficiency associated with the authenticated user, the first VoiceXML document, to include second VoiceXML information associated with an inexperienced user when the proficiency corresponds to the inexperienced user, and
   where the second VoiceXML information is different than the first VoiceXML information.

3. The method of claim 2,
   where the information, included in the database, comprises biometric information associated with the user, and
   where determining whether the spoken utterance matches information included in the database includes:
      determining whether biometric information associated with the spoken utterance matches the biometric information associated with the user.

4. The method of claim 2, where the information, included in the database, includes a personal identification number associated with the user, and
   where determining whether the spoken utterance matches information included in the database includes:
      recognizing a content of the spoken utterance; and
      determining whether the recognized content matches the personal identification number associated with the user.

5. The method of claim 2,
   where the information, included in the database, includes a personal identification number associated with the user,
   where the method further includes:
      recognizing a user keypad entry; and
      determining whether the recognized user keypad entry matches the personal identification number associated with the user, and
   where authenticating the user includes:
      authenticating the user when the spoken utterance matches the information included in the database and the recognized user keypad entry matches the personal identification number associated with the user.

6. The method of claim 1,
further comprising:
determining, based on the role, a type of information that the user is permitted to access for the particular project,
where dynamically generating the second VoiceXML document and the second grammar associated with the second VoiceXML document further based on the determined type of information that the user is permitted to access for the particular project.

7. The method of claim 1, further comprising:
receiving a voice request from the user to call the individual associated with the particular project;
retrieving contact information associated with the individual associated with the particular project; and
initiating a call between the user and the individual associated with the particular project.

8. The method of claim 7,
where the voice request to call the individual associated with the particular project designates an identity of the individual associated with the particular project based on the role of the individual associated with the particular project.

9. The method of claim 1, further comprising:
receiving, from the user, a voice request to modify the project management information;
determining whether a project management access level, of the identified plurality of project management access levels, associated with the particular project permits the requested modification; and
updating the project management information when the project management access level permits the requested modification.

10. The method of claim 1, further comprising:
receiving, based on the responsive voice dialog, a voice request from the user to contact the individual associated with the particular project,
the project management information including information associated with the individual associated with the particular project, and
the information associated with the individual associated with the particular project including contact information of the individual associated with the particular project; and
initiating, based on the voice request and based on the contact information, a telephone call between the user and the individual associated with the particular project.

11. A system comprising:
one or more data structures to store project management information; and
a project management interactive voice response (IVR) system connected to a plurality of user telephony devices, via a telephony network,
the project management IVR system comprising:
a voice dialog service to:
dynamically generate Voice Extensible Markup Language (VoiceXML) documents and grammars associated with the VoiceXML documents, based on one or more requests received from a user and via the telephony network, and the stored project management information,
where the stored project management information includes information identifying a function that the user is permitted to perform with respect to a particular project associated with the received one or more requests,
dynamically generate interactive voice dialogs based on the dynamically generated VoiceXML documents and the dynamically generated grammars, and
provide the interactive voice dialogs to the user via the telephony network,
at least one of the interactive voice dialogs including a phrase that identifies a role of an individual associated with the particular project and a phase of the particular project.

12. The system of claim 11,
where project management information is managed by the project management tools, and
where the project management tools comprise at least one of project management web-based applications, project management client/server applications, project management stand alone applications, or project management query-based applications.

13. The system of claim 11,
where the project management IVR system further comprises:
a user verification service to authenticate an identity of the user; and
a user role and accessibility service to identify, based on the identity of the user,
at least one project management access level for the authenticated user,
where the identified at least one project management access level includes a plurality of types of information that the authenticated user is permitted to access for one or more projects, and
where the voice dialog service is further to dynamically generate the VoiceXML documents and the grammars, based on the plurality of types of information included in the identified at least one project management access level for the authenticated user.

14. The system of claim 11, where the voice dialog service is further to:
publish the generated VoiceXML documents, and
provide the published VoiceXML documents to the user.

15. The system of claim 11, where the project management IVR system further comprises:
a speech recognition service to receive and recognize user responses to the provided interactive voice dialogs.

16. The system of claim 15,
where the project management IVR system is to:
identify, based on a role associated with the user, a type of information, that the user is permitted to access for the particular project, and
where the speech recognition service is further to:
determine whether a voice response, received from the user, includes a request for project management information modification;
determine, based on the determined type of information and the information identifying the function that the user is permitted to perform with respect to the particular project, whether the user is authorized to perform the requested project management information modification; and
modify the project management information, associated with the request and stored in the one or more data structures, when the user is authorized to perform the requested project management information modification.

17. The system of claim 15, where the speech recognition service is further to:
  determine whether a voice response includes a request for additional project management information; and
  forward the request to the voice dialog service to dynamically generate another interactive voice dialog based on the request.

18. The system of claim 15, where the speech recognition service is further to:
  determine whether a voice response includes a request for a telephone call to another individual associated with the particular project; and
  initiate the telephone call between the user and the other individual associated with the particular project.

19. A method comprising:
  monitoring, by one or more devices, project management information for notification triggering events;
  identifying, by the one or more devices and based on monitoring the project management information, a notification triggering event of the notification triggering events;
  retrieving, by the one or more devices, project management information from a database in response to identifying the notification triggering,
    the retrieved project management information including contact information for notifying a user, when the notification triggering event is identified, and information identifying the notification triggering event;
  generating, by the one or more devices, a Voice Extensible Markup Language (VoiceXML) document and one or more grammars associated with the VoiceXML document, based on the retrieved project management information,
    the generated VoiceXML document including the information identifying the notification triggering event;
  generating, using one or more devices, at least one voice dialog, based on the generated VoiceXML document and the generated one or more grammars;
  initiating, by the one or more devices and based on the contact information included in the retrieved project management information, a telephone call to the user to notify the user of the identified notification triggering event; and
  providing, by the one or more devices, the generated at least one voice dialog to the user during the telephone call,
    the generated at least one voice dialog including a phrase that identifies a particular project associated with the identified notification triggering event, a role of an individual associated with the particular project, and a state of the particular project.

20. The method of claim 19, where the notification triggering event includes information identifying the state of the particular project and that the state is a critical state.

21. The method of claim 19, further comprising:
  authenticating, before providing the generated at least one voice dialog, the user after the user picks up the telephone call.

22. The method of claim 19, further comprising:
  receiving a request, from the user and during the telephone call, for additional project management information;
  retrieving the additional project management information from the database based on the request;
  generating a second VoiceXML document and one or more additional grammars associated with the second VoiceXML document, based on the retrieved additional project management information;
  generating a second voice dialog based on the generated second VoiceXML document and the generated one or more additional grammars; and
  providing the second voice dialog to the user.

* * * * *